US008611727B2

(12) United States Patent
Cuttner

(10) Patent No.: US 8,611,727 B2
(45) Date of Patent: Dec. 17, 2013

(54) PERSONALIZATION OF MASS-DUPLICATED MEDIA

(75) Inventor: Craig D. Cuttner, Norwalk, CT (US)

(73) Assignee: Home Box Office, Inc., New York, NY (US)

( * ) Notice: Subject to any disclaimer, the term of this patent is extended or adjusted under 35 U.S.C. 154(b) by 1450 days.

(21) Appl. No.: 12/240,273

(22) Filed: Sep. 29, 2008

(65) Prior Publication Data

US 2009/0028518 A1  Jan. 29, 2009

Related U.S. Application Data

(63) Continuation of application No. 10/745,938, filed on Dec. 24, 2003, now abandoned.

(51) Int. Cl.
H04N 5/93  (2006.01)
(52) U.S. Cl.
USPC ........... 386/279; 386/239; 386/248; 386/260; 386/278; 386/280
(58) Field of Classification Search
None
See application file for complete search history.

(56) References Cited

U.S. PATENT DOCUMENTS

| | | | |
|---|---|---|---|
| 4,972,471 A | 11/1990 | Gross et al. | |
| 5,353,931 A | 10/1994 | Antik | |
| 5,579,119 A | 11/1996 | Mimura | |
| 5,668,603 A | 9/1997 | Copeland | |
| 5,739,864 A | 4/1998 | Copeland | |
| 5,761,601 A | 6/1998 | Nemirofsky et al. | |
| 6,011,758 A | 1/2000 | Dockes et al. | |
| 6,285,774 B1 | 9/2001 | Schumann et al. | |

(Continued)

FOREIGN PATENT DOCUMENTS

| | | |
|---|---|---|
| EP | 1 028 423 A1 | 8/2000 |
| EP | 1 005 034 B1 | 11/2000 |

(Continued)

OTHER PUBLICATIONS

"Copyright Protection for the Electronic Distribution of Text Documents" by Jack T. Brassil, Steven Low, and Nicholas F. Maxemchuk; Proceedings of the IEEE, vol. 87, No. 7, Jul. 1999; pp. 1181-1196.

(Continued)

*Primary Examiner* — Daquan Zhao
*Assistant Examiner* — Sunghyoun Park
(74) *Attorney, Agent, or Firm* — Mendelsohn, Drucker & Dunleavy, P.C.; Edward J. Meisarosh; Steve Mendelsohn

(57) ABSTRACT

A process and facility supports recipient-specific customization of mass-duplicated tapes. Video from a master tape is passed through a VBI encoder whose output feeds two or more overlay units, each associated with a tape recorder. Recipient-specific watermarking instructions and address information for each tape are fed to the VBI encoder where they are encoded into the VBI of the video. Each overlay unit reads the VBI and decodes the address, and if relevant for that unit, applies the overlays to the video, which is recorded by its associated recording deck. Optionally, each tape and overlay unit includes a barcode that is scanned into a database where associations between tapes and the overlays are stored. Alternatively, high-density barcode labels that include the overlay instructions are printed and applied to tapes. The barcodes are scanned into the overlay units and applied following the receipt of a timecode or other trigger.

20 Claims, 9 Drawing Sheets

(56) References Cited

U.S. PATENT DOCUMENTS

| | | | |
|---|---|---|---|
| 6,381,341 | B1 | 4/2002 | Rhoads |
| 6,400,827 | B1 | 6/2002 | Rhoads |
| 6,405,203 | B1 | 6/2002 | Collart |
| 6,496,591 | B1 | 12/2002 | Rhoads |
| 2001/0006577 | A1 | 7/2001 | Bae |
| 2002/0032502 | A1* | 3/2002 | Russell .................. 700/214 |
| 2002/0131768 | A1* | 9/2002 | Gammenthaler ............ 386/107 |

FOREIGN PATENT DOCUMENTS

| | | |
|---|---|---|
| EP | 1 251 502 A1 | 10/2002 |
| WO | 98/08180 A2 | 2/1998 |
| WO | 99/65241 A1 | 12/1999 |
| WO | 02/43065 A2 | 5/2002 |
| WO | 02/065750 A2 | 8/2002 |

OTHER PUBLICATIONS

"Image Watermarking Technique Based on 2-D Barcode PDF417" by Zhang et al., Abstract, pp. 1-2.

Advisory Action recived in U.S. Appl. No. 10/745,938, filed Dec. 24, 2003 dated Aug. 11, 2008.

Final Office Action recived in U.S. Appl. No. 10/745,938, filed Dec. 24, 2003 dated May 30, 2008.

Non-Final Office Action received in U.S. Appl. No. 10/745,938, filed Dec. 24, 2003 dated Nov. 8, 2007.

* cited by examiner

FIG. 1 - Prior Art

| Overlay-Unit Serial Number | Recording-Deck Label |
|---|---|
| 1270 | 1 |
| 1271 | 2 |
| 1272 | 3 |
| 1273 | 4 |

TABLE 1

| Tape Barcode # | Recipient | Affiliation | Street Address |
|---|---|---|---|
| 3456 | John Smith | New York Times | 110 American Ave. New York, NY 10010 |
| 3457 | Roger Wilco | Chicago Sun Times | 29 Locust Chicago, IL 60609 |
| 3458 | Gene Screen | Today Show | 3300 15th Street Queens, NY 11905 |
| 3459 | Matt Flat | Internet Movie Reviews | P.O. Box 911 Albany, NY 33455 |

TABLE 2

FIG. 8

| Page | Data |
|---|---|
| 0 | This videotape is supplied to {Affiliation} with a restricted use agreement |
| 1 | Copy assigned to {Recipient}. DO NOT DUPLICATE |
| 2 | <Watermark: Function of {Recipient, Affiliation} > |

TABLE 3

| Time-In | Time-Out | Action |
|---|---|---|
| 00:00:00 | 00:02:00 | Full screen display page 0 |
| 00:04:00 | 00:15:00 | Display page 1 translucent key 50% opaque |
| 00:05:00 | 00:15:00 | Move page 1, in X/Y pattern, from top right to bottom left every 5 seconds |
| 00:15:00 | 00:17:00 | Display watermark, page 2, translucent key 2%, duration 3 seconds, center screen |

TABLE 4

FIG. 9

PERSONALIZATION OF MASS-DUPLICATED MEDIA

This application is a continuation of U.S. patent application Ser. No. 10/745,938, filed on Dec. 24, 2003, incorporated herein by reference in its entirety.

BACKGROUND OF THE INVENTION

1. Field of the Invention

The present invention relates to multimedia content distribution, and, more specifically, to customization and personalization of multimedia content during mass duplication.

2. Description of the Related Art

Currently, videotapes (e.g., VHS, Sony Betamax™, DV, and digital-8) are duplicated by playing back one "master tape" to many recording decks to make hundreds of simultaneous (and substantially exact) copies of the master.

In some instances, in particular, where it is of interest to minimize piracy or misuse of the copies, it is desired to personalize the copies so that each copy contains some unique identification, potentially related to the intended recipient's identity and usage rights.

For example, in a traditional tape duplication facility, such as that illustrated by FIG. 1, master tape 102 is played back by a master-tape player 104 whose output is routed through character generator/keyer (CGK) 106. In the CGK, personalization data (e.g., an approved company or recipient's name) is rendered and superimposed on the video and audio. The personalization can include a visual watermark or "open super" on the screen that would be both visually obnoxious and difficult to obscure (e.g., moving about the screen) by pirates interested in making illegal copies for distribution. The personalized output of the CGK is replicated and (unity) amplified (108), then distributed to multiple recording decks (110) where it is copied onto multiple tapes. The recorded tapes are then shipped to their intended recipients (e.g., pre-release film reviewers). Duplication controller 112 provides instructions to the CGK to create the open super, and also controls (e.g., via RS-232 or RS-422 serial interface) the operation of master-tape player 104 and recording decks 110. As a result, the audio and video that is recorded by recording decks 110 include not only the original information on master tape 102 but also the additional information inserted by the CGK onto the feed.

As an example, if a large number of copies of a movie are to be made for an airline (e.g., Southwest Airlines), a master copy of the movie is inserted into playback deck 104, and played back through CGK 106, which is instructed by duplication controller 112 to overlay "Property of Southwest Airlines," onto the feed. The feed is then amplified by distribution amplifier 108 and recorded by recording decks 110. When the copies are played back, the overlay will be displayed, providing ownership identification to anyone viewing the tapes.

As can be appreciated, duplication facility 100 of the prior art cannot support simultaneous insertion of a different overlay on each tape copy. Instead, to provide a different overlay on each master-tape copy, it would be necessary to substantially repeat the overlay process for each unique copy. To make N copies, each with a different overlay, can require up to N times the amount of time required to make one copy.

Thus, the personalization process within a facility such as that illustrated by FIG. 1 requires that the "personalization" be the same for all copies that are simultaneously recorded or that portion of the master tape that is to be personalized needs to be replayed to each recording deck in turn with the recipient-unique portion of the personalization information changed in the CGK with each new recording. Either of these approaches is inefficient and subject to human error associated with overlaying personalization data onto the wrong tape or shipping a tape to the wrong recipient.

What is needed is a low-cost method and facility for mass-duplication of tapes that allow for concurrent recipient-unique customization or personalization of tapes. The method should support identifying both a personalized physical tape and personalizing content on the tape, as well as ensuring that each tape has the proper content and is physically sent to the correct recipient.

SUMMARY OF THE INVENTION

Problems in the prior art are addressed in accordance with principles of the present invention by a tape duplication and customization facility (DCF) and process that supports unique customization of each tape with recipient-specific information while allowing concurrent recording of multiple tapes from a master playback-deck.

In one embodiment, the facility includes a master-tape player playing a master tape into a vertical-blanking interval (VBI) encoder. The output of the VBI encoder feeds two or more overlay units, each overlay unit associated with a tape recorder. Recipient-specific watermarking instructions for each tape are fed to the VBI encoder where they are encoded into the vertical blanking interval of the video output from the master-tape player. Each set of watermarking instructions that are fed to the VBI encoder includes an address for a specific overlay unit, or a broadcast or multicast address for watermarking instructions that are to be executed by all, or a group, respectively, of the overlay units that receive the VBI-encoded instructions. Each overlay unit is adapted to read the VBI and decode a broadcast, or overlay-unit-specific multicast or unicast address, as well as the associated watermarking instructions. The overlay unit is adapted to interpret the VBI-encoded instructions and generate recipient-specific watermarks from these instructions that are overlaid onto the video and/or audio that is fed to the overlay unit's associated tape recorder. These recipient-specific watermarks are recorded on a tape in the associated recorder for the purpose of tape identification and distribution/piracy control.

In various embodiments, each tape includes a barcode of a unique identifier for the tape and each overlay unit includes a barcode of a unique identifier (e.g., serial number) for the overlay unit. The information on the barcodes for each tape and each overlay unit is captured at the time the tape is inserted into the recorder associated with the overlay unit to create an association between each addressable overlay unit and each tape. This association can be stored in a database. The association links each tape's identifier to recipient-specific instructions for that tape that can also be stored in a database. The instructions are sent to the overlay unit associated with each tape's recorder using the unique address of the overlay unit. A master tape is then played back by a master tape-player whose output is routed through each overlay unit. Each overlay unit overlays a unique watermark onto the video/audio stream that passes through it and the resulting stream is then recorded by each associated tape recorder resulting in concurrent overlaying of recipient-specific watermarking information onto each tape with only a single-pass recording.

In one embodiment the present invention is a method for processing a content stream that includes one or more of audio content and video content. The method includes encoding two or more different sets of customization data into the content stream to generate an encoded content stream, where (a) each set of customization data includes an identifier for a different set of one or more customization devices and modification information associated with the identifier, and (b) each different customization device is adapted to modify the content stream based on the modification information in the corresponding set of customization data to generate a customized content stream.

In another embodiment the present invention is a customization device for generating a customized content stream. The customization device is assigned an address specific to a set of one or more customization devices to which the customization device belongs. The customization device includes at least one input port adapted to receive an encoded content stream comprising two or more different sets of customization data and one or more of audio content and video content, where, each set of customization data includes an identifier specific to a set of one or more customization devices. The customization device further includes at least one processor adapted to determine whether the identifier in the customization data corresponds to the address specific to the customization device. When the address and the identifier correspond, the processor (a) extracts, from the received encoded content stream, information from the set of customization data corresponding to the customization device, and (b) modifys the content stream based on information in the corresponding set of customization data to generate the customized content stream.

In another embodiment the present invention is a method for distributing individualized content. The method involves (a) broadcasting a content stream that includes one or more of audio content and video content to a plurality of sets of customization devices, and (b) delivering a unique set of customization data to each set of customization devices. Each different customization device is adapted to (i) receive the broadcast content stream and (ii) modify the broadcast content stream based on modification information in the corresponding set of customization data to generate a customized content stream.

In another embodiment the present invention is a method for generating a customized content stream from a content stream that includes one or more of audio content and video content. The method involves combining a set of customization data with a storage medium to create a combined storage medium adapted to store the customized content stream. The set of customization data contains information to be used by a customization device for modifying the content stream to generate the customized content stream to be stored into the combined storage.

BRIEF DESCRIPTION OF THE DRAWINGS

Other aspects, features, and advantages of the present invention will become more fully apparent from the following detailed description, the appended claims, and the accompanying drawings in which:

FIGS. 8 and 9 illustrate TABLES 1-4, which represent tables stored in a database accessible to the DCC.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Duplication & Customization Facility (DCF)

Figure 1:
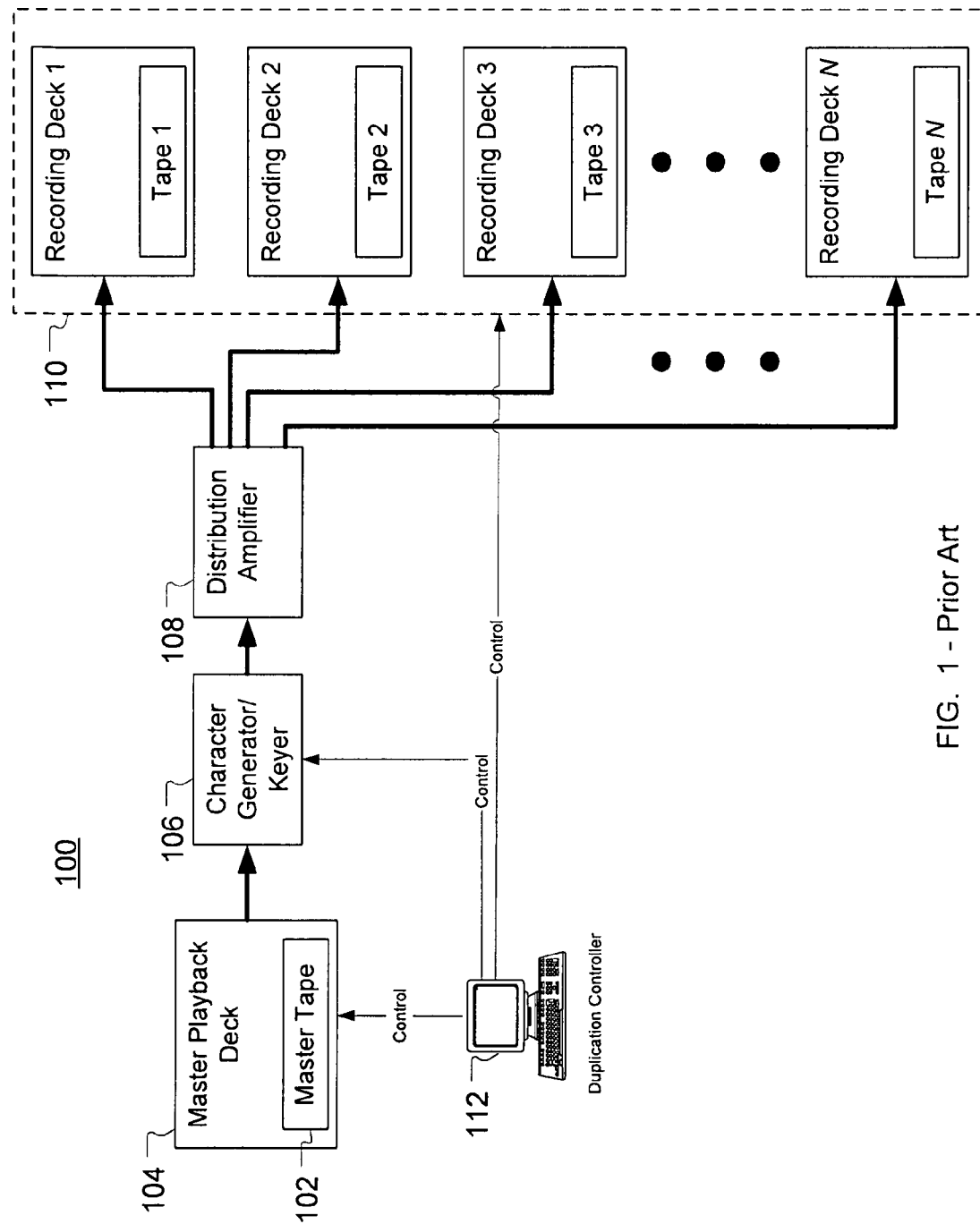
FIG. 1 is a block diagram of an exemplary duplication facility according the prior art.
Figure 2:
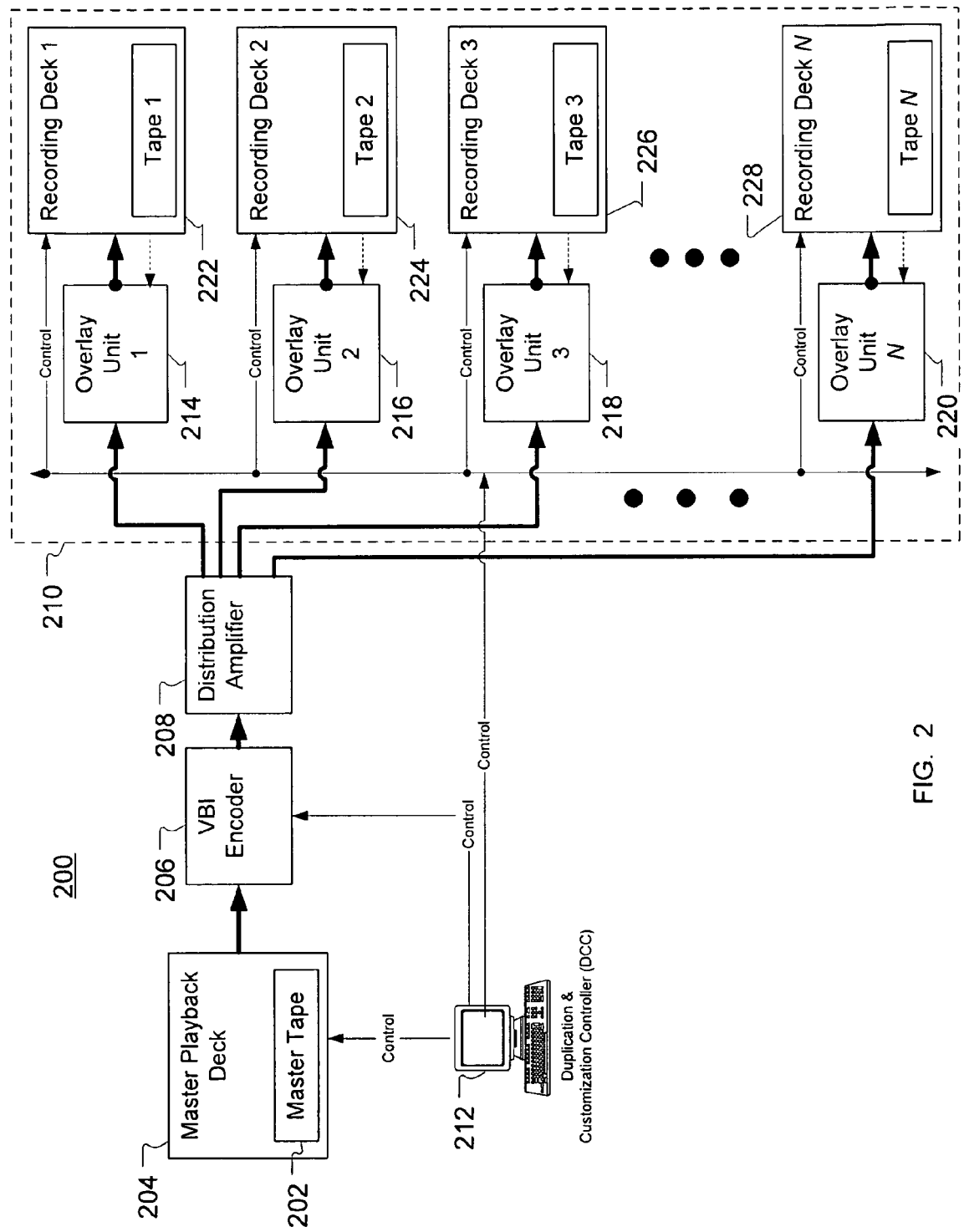
FIG. 2 is a block diagram of a duplication and customization facility (DCF) according to one embodiment of the present invention.

FIG. 2 depicts duplication and customization facility (DCF) 200 according to one embodiment of the present invention. DCF 200 includes master playback deck 204 adapted to play back master tape 202. The video and audio output of master playback deck 204 feeds vertical blanking interval (VBI) encoder 206 (e.g., encoder model EN-470 manufactured by EEG Enterprises, Inc., of Farmingdale, N.Y.), which is capable of encoding a data signal onto one or more of the VBI lines of the video signal (e.g., line-21, which is used to carry closed caption in television broadcast signals). The data-enhanced video output of the VBI encoder feeds distribution amplifier 208. The output of distribution amplifier 208 feeds overlay and recording subsystem 210, which includes N addressable overlay units 214, 216, 218, and 220 and N associated recording decks 222, 224, 226, and 228.

The video from the distribution amplifier is distributed to the N overlay units within overlay and recording subsystem 210, and the output of each overlay unit feeds its associated recording deck. For example, the output of overlay unit 214 is fed to recording deck 222, the output of overlay unit 216 is fed to recording deck 224, the output of overlay unit 218 is fed to recording deck 226, and the output of overlay unit 220 is fed to recording deck 228.

In operation, duplication and customization controller (DCC) 212 instructs master playback deck 204 to play and instructs VBI encoder 206 to insert in-band overlay commands into the VBI of the video from the master playback deck. It also instructs one or more of the recording decks within overlay and recording subsystem 210 to record. The VBI commands can be addressed to one, all, or a subset of the overlay units within subsystem 210 based on an overlay unit's ability to decode the VBI data and recognize its own unique address, a broadcast address, or an address that falls within a multicast group to which the overlay unit belongs, respectively. These in-band commands include instructions for the overlay units to insert overlays such as text, graphics, audio, and/or video onto their AV feed from the master playback deck such that the audio and video that is recorded by one or more of the recording decks includes not only the original information on master tape 202 but also the additional information inserted by the recorder's local overlay unit.

Because the overlay commands from DCC 212 can be individually addressed to each overlay unit within overlay and recording subsystem 210, DCC 212 has the ability to send unique commands to each overlay unit independently of the others. Using this capability, the DCC can customize the overlay that is inserted into each copy of the master tape. This customization can consist of a combination of common overlay elements (e.g., video, graphics, text, and/or audio) and/or overlay elements that are unique to each copy of the master feed.

Assuming the DCC incorporates a database that includes an association between each overlay unit and the intended recipient of a tape that is recorded in each overlay unit's associated recording deck, the system can be used to add recipient-specific watermarks to each tape. These recipient-specific watermarks can be useful for tape identification and distribution/piracy control.

An overlay unit can be as simple as a CGK of the prior art (e.g., if direct point-to-point control from the DCC to each overlay unit is provided). Alternatively, as in the exemplary implementation of FIG. 2, it can include a unique identifier and the ability to be uniquely addressed via a command interface that can be in-band (e.g., within the VBI of the video that is input to the overlay unit). Alternatively, in some embodiments, an out-of-band interface (e.g., an RS-422 interface or Internet protocol (IP)-interface) can be used.

Figure 3:
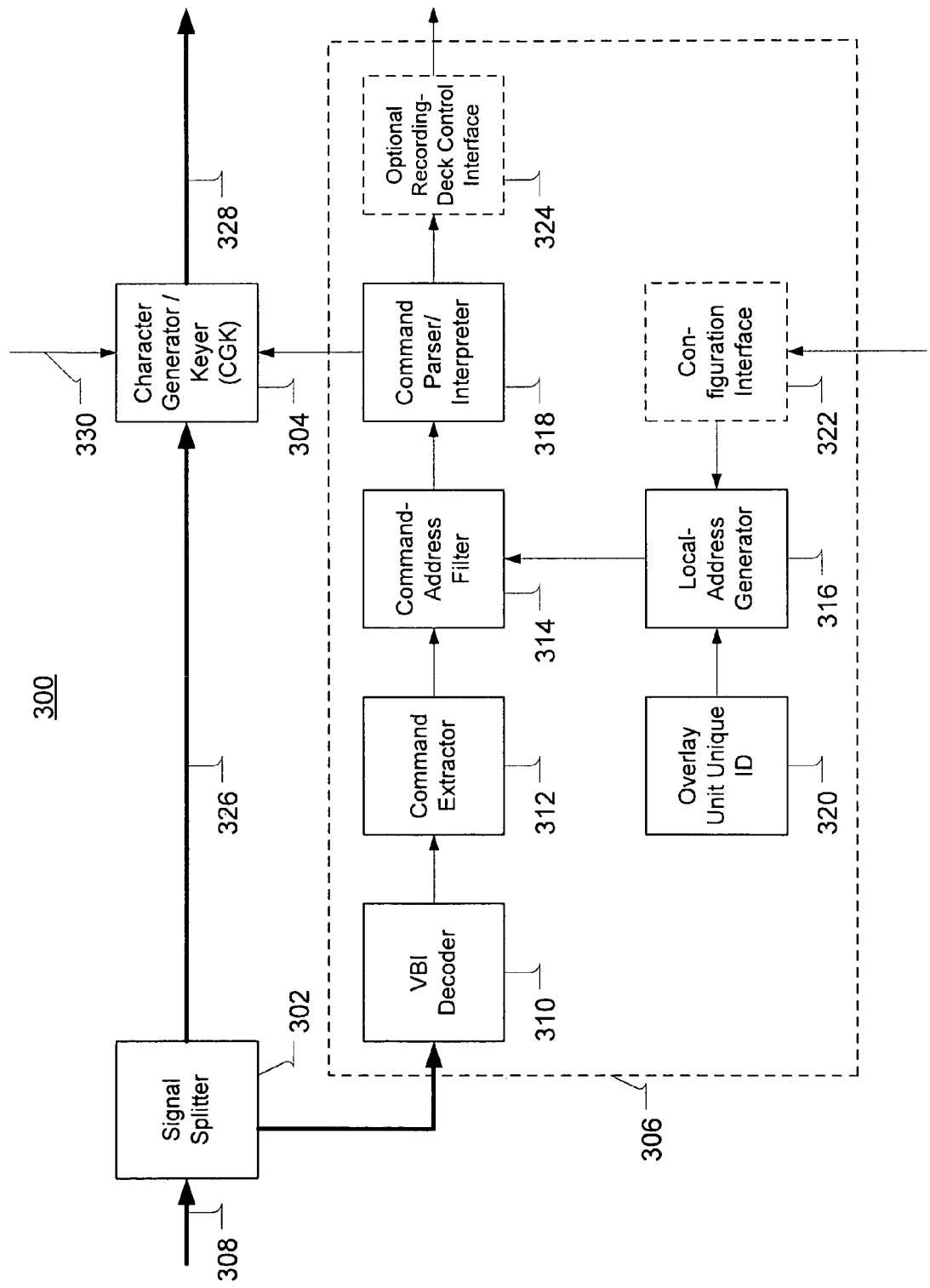
FIG. 3 is a block diagram of overlay unit of FIG. 2 according to one embodiment of the present invention.

An overlay unit (300) according to one embodiment of the present invention is illustrated by FIG. 3. As shown, it includes signal splitter 302, character generator/keyer 304, and command processing unit 306. Signal splitter 302 receives AV feed 308 and splits the video between command processing unit 306 and CGK 304 while passing the audio through to the CGK.

Within command processing unit 306, the video is first processed by VBI decoder 310, which decodes the data that is modulated (e.g., NABTS) onto the video signal and passes the decoded data in binary form to command extractor 312.

The command extractor recognizes the framing and structure of the overlay command packets, reassembles the commands, and passes them to command-address filter 314.

The command-address filter compares the address of each extracted command with the local address of the overlay unit that is passed to the command-address filter by local-address generator 316. If the command matches the address (or a broadcast or multicast address) for the overlay unit, it passes the command to command parser/interpreter 318; otherwise, the command packet is ignored. The local address is determined by the local-address generator using a combination of the overlay unit's unique identifier (320) and/or, optionally, address information that is input to the unit via configuration interface 322.

Once a command is received by the command parser/interpreter 318, it is translated to a set of instructions appropriate for control of CGK 304. Additionally or optionally, commands may include instructions for recording-deck control. These are translated by command parser/interpreter 318 and passed to the local recording deck via optional recording-deck interface 324.

CGK 304 receives the overlay instructions from command processing unit 306 and inserts the instructed overlays onto its input AV feed 326 to effectively customize the video. The customized video is output via overlay unit output port 328 where it is typically input to a local recording deck. CGK 304 can also optionally receive overlay instructions through out-of-band interface 330.

In alternative implementations, an overlay unit can include elements of a character generator, graphic and video keyer, and audio mixer. Different implementations of the overlay unit can process video and audio in various formats (e.g., analog composite, s-video, or component; digital CCIR-601, SMPTE-292M, MPEG-2, MPEG-4, MPEG-7, H.264; Dolby digital, Dolby-E, or MP3). In the case of implementations of the overlay unit that work with compressed video and audio formats, the overlay unit can completely or only partially (as required) decompress one or more of the video and audio feeds, insert the overlays, and recompress the video and/or audio. In cases where the input stream to the overlay unit is a multiplex of compressed multimedia objects (e.g., MPEG-7), the overlay unit can include appropriate hardware to demultiplex, decode, overlay, encode, and remultiplex one or more of the objects in the stream, or where applicable, add additional objects (e.g., overlay objects) into the multiplex.

Capabilities of the CGK in various embodiments include the ability to render textual characters (e.g., ASCII) and/or bitmapped graphical information that would be useful as a "watermark." These characters can be coded (e.g., using pseudo-random sequences) in the video in a way that is unperceivable by a viewer but decodable by an entity skilled in how the encoding process was accomplished. The CGK can overlay the text or graphics using superimposition in various modes including opaque, translucent, semi-opaque, non-additive mix, and alpha-blend. Implementations of the overlay unit also pass or reinsert (as appropriate to the implementation) various forms of anti-copy (e.g., Macrovision) or other security encoding signals that may be present on the input signal. Additionally, certain implementations of the CGK can strip VBI signals from the incoming feed and encode VBI into the outgoing feed as desired by the application.

In one embodiment, the overlay unit is addressable (e.g., broadcast, multicast, or singlecast) from a shared bus or packet network, such as Ethernet or RS-422, or point-to-point wired to support unique addressability from a controller (e.g., DCC 212).

In another embodiment, the overlay unit's address is derived from a unique identifier that is manufactured or configured into the unit (e.g., via dip switch or PROM), or that it receives or derives from its associated recording deck.

In another embodiment, the address of the overlay unit is a function $f$ of a barcode label that is placed on the tape. The barcode label on the tape is read by the recording deck and reported to the overlay unit. The address of the overlay unit is determined according to address=$f$ (barcode). In this embodiment, if the DCC has knowledge of the tape's barcode and the function $f$, the DCC can use this knowledge to uniquely address overlay instructions to the desired overlay unit to customize the tape, independent of the DCC needing to know which specific overlay unit or recorder is involved.

In another embodiment, the recording deck has a unique barcode label, and a database accessible to the DCC stores associations between each recording deck's barcode and the address of the associated overlay unit. Just prior to inserting a tape into a recording deck, the barcode on the tape and the barcode on the recording deck are scanned (e.g., by a wireless barcode reader) and fed to the DCC. The DCC uses the recording-deck-to-overlay-unit association from the database along with the tape-to-recording-deck association provided by the scanner to create an overlay-unit-to-tape association. The DCC then uses the overlay-unit-to-tape association to address overlay instructions to the overlay unit to appropriately customize the tape.

Duplication and Customization Procedure

Figure 4:
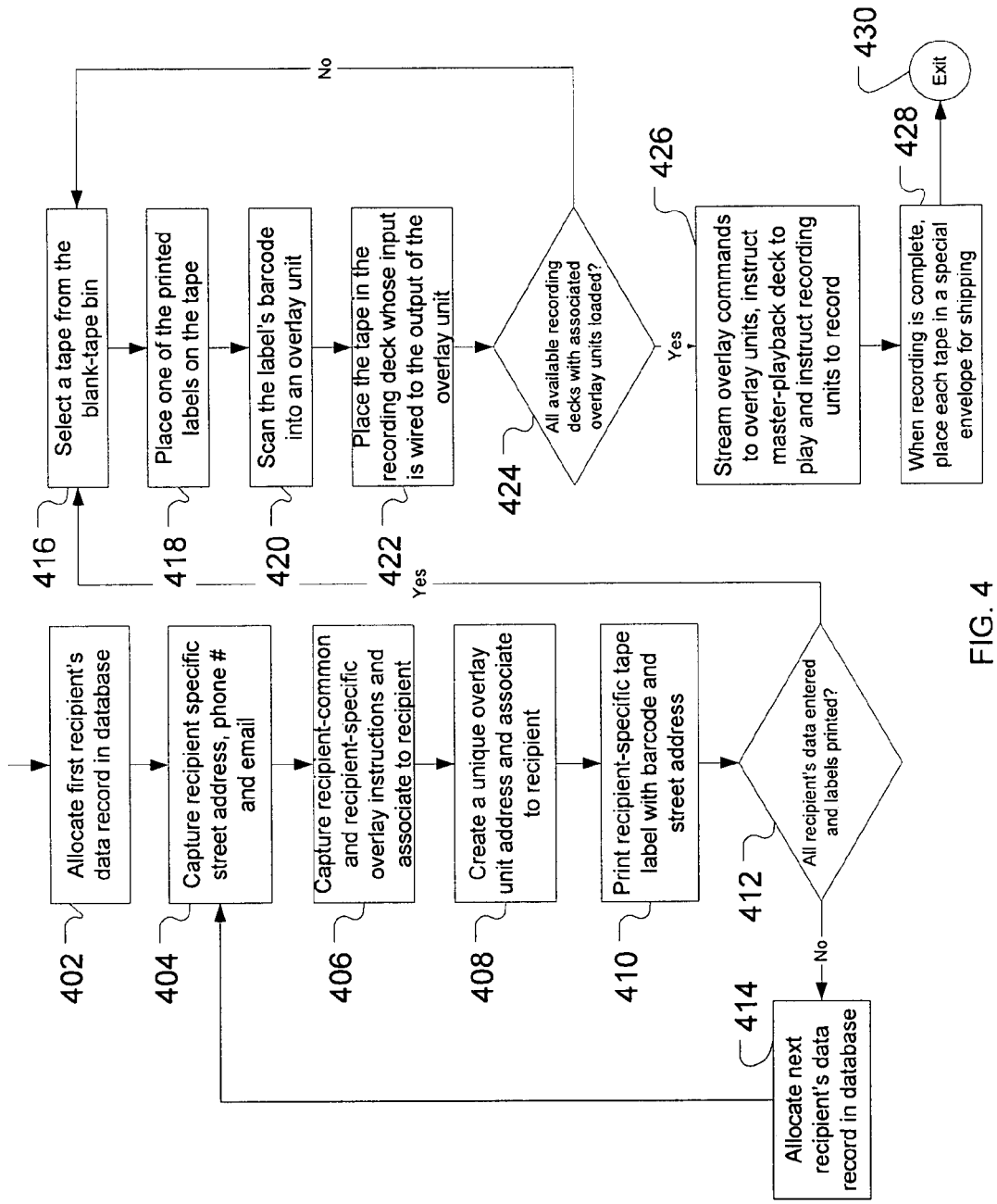
FIG. 4 is a flow diagram of a duplication and customization procedure according to one embodiment of the present invention.

FIG. 4 illustrates a duplication and customization procedure according to one embodiment of the present invention. This procedure reduces the probability of errors in customization and duplication of tapes and consequently reduces the probability that a tape might be delivered to the wrong recipient or contain an incorrect customization relative to a recipient.

As illustrated, in step 402, a record corresponding to a first recipient is allocated in a database (e.g., a database accessible to DCC 212 of FIG. 2). Next, in step 404, the record is populated with the recipient's contact information (e.g., street address, phone number, and email address). In step 406, data structures containing instructions for overlays that are to be commonly applied to tape copies for multiple recipients, and data structures containing instructions for overlays that are to be applied specifically to a tape copy for the current recipient, are identified and linked or associated with the current recipient's record in the database.

In step 408, an address for an overlay unit is created (e.g., drawn from a list of available addresses). This address is then linked or associated with the recipient's record, and, in step 410, a tape label is printed that includes both a barcode and the recipient's street address (and phone number, if applicable, for example, for a package delivered by a priority, receipt-requested, courier service). The barcode includes the address for the overlay unit that was associated with the recipient's record in the database. This address could be a multicast group address if multiple tapes with the same customization are to be made for a single recipient.

Next, in step 412, a test is performed to see if data for all the recipients have been entered into the database and if all their labels have been printed. If the test fails, then, in step 414, another recipient record is allocated and the process loops back to step 404. If all recipients data has been entered and all labels printed, then in step 416, a blank (or recycled non-blank) tape is selected from a repository of tapes and, in step 418, one of the printed labels is applied to the tape.

In step 420, the barcode (e.g., the address) on the tape's label is scanned into an overlay unit (e.g., by a scanner associated with or integrated into the overlay unit) and, in step 422, the tape is placed into a recording deck whose input is wired to the output of the overlay unit into which the barcoded overlay instructions and address were just scanned.

In step 424, a test is performed to see if all the decks with associated overlay units have been loaded. Alternatively, a test could have been run to see if all the labels were applied to tapes and all the tapes were loaded into recording decks with associated overlay units. Other alternatives are possible. If the test of step 424 fails, then the procedure loops back to step 416, where another tape is selected.

Once all the tapes have been loaded into the recording decks, in step 426, the overlay commands are streamed (e.g., via VBI) to the overlay units, the master-playback unit is instructed to play, and the recording units are instructed to record. The commands can include triggers for when they actually get applied by the overlay units or alternatively, they can be executed as they arrive at the overlay units.

When recording is complete, in step 428, each tape is removed from its recording deck and placed into a specially designed shipping envelope that has a window to allow the address that was printed on the tape to be visible external to the envelope. This removes the necessity of printing a separate label and minimizes the possibility of the associated errors. The procedure exits at step 430.

High-Density Barcode

In another embodiment, a high-density bar code (such as a 3-D X-Y barcode) can be used on each tape and encoded with the overlay commands for the tape. This barcode can be scanned, potentially by a barcode scanner that is connected to, or integrated into, an overlay unit. Such an overlay unit is illustrated in FIG. 5 by overlay & scanner unit 506 with integrated barcode scanner 508, where other elements of facility 500 perform similar functions to corresponding elements of FIG. 2.

In operation, a tape is labeled with a high-density barcode that includes commands for the overlay unit. The tape is carried to the physical location of, for example, overlay & scanning unit 506, swiped in front of the integrated scanner 508, and inserted into associated recording deck 510. When the tape is swiped in front of integral scanner 508, the overlay commands are stored by the overlay & scanner unit 506 in preparation for recording. When recording is started, overlay & scanner unit 506 receives a trigger (e.g., an in-band time-code reference in the feed from master-tape player 502) and begins to execute the overlay commands, resulting in a customized overlay being inserted into the feed that is recorded onto the tape. Similarly, other tapes may be uniquely labeled with a high-density barcode, scanned and inserted into the other recording units in the recording facility allowing concurrent individualized customization to occur. This embodiment minimizes the possibility of a tape receiving the wrong recipient-specific watermarking overlay by limiting the potential for tape or information mismanagement. In one embodiment, the barcode of the recipient-specific overlay commands are printed onto a label along with the recipient's address to create a barcode-address label that is applied to the tape. In this way, the overlay-commands-to-recipient-address association need be stored only in the single system that prints the label.

In another embodiment, after recording, a tape with a high-density barcode-address label is inserted into a shipping envelope that is designed with a window in the proper position to let the address that was printed on the barcode-address label of the tape to be viewed externally to the shipping envelope. This process eliminates both the extra work and the extra opportunity for error associated with a process that requires that a separate shipping label be printed and applied to the shipping envelope.

Figure 5:
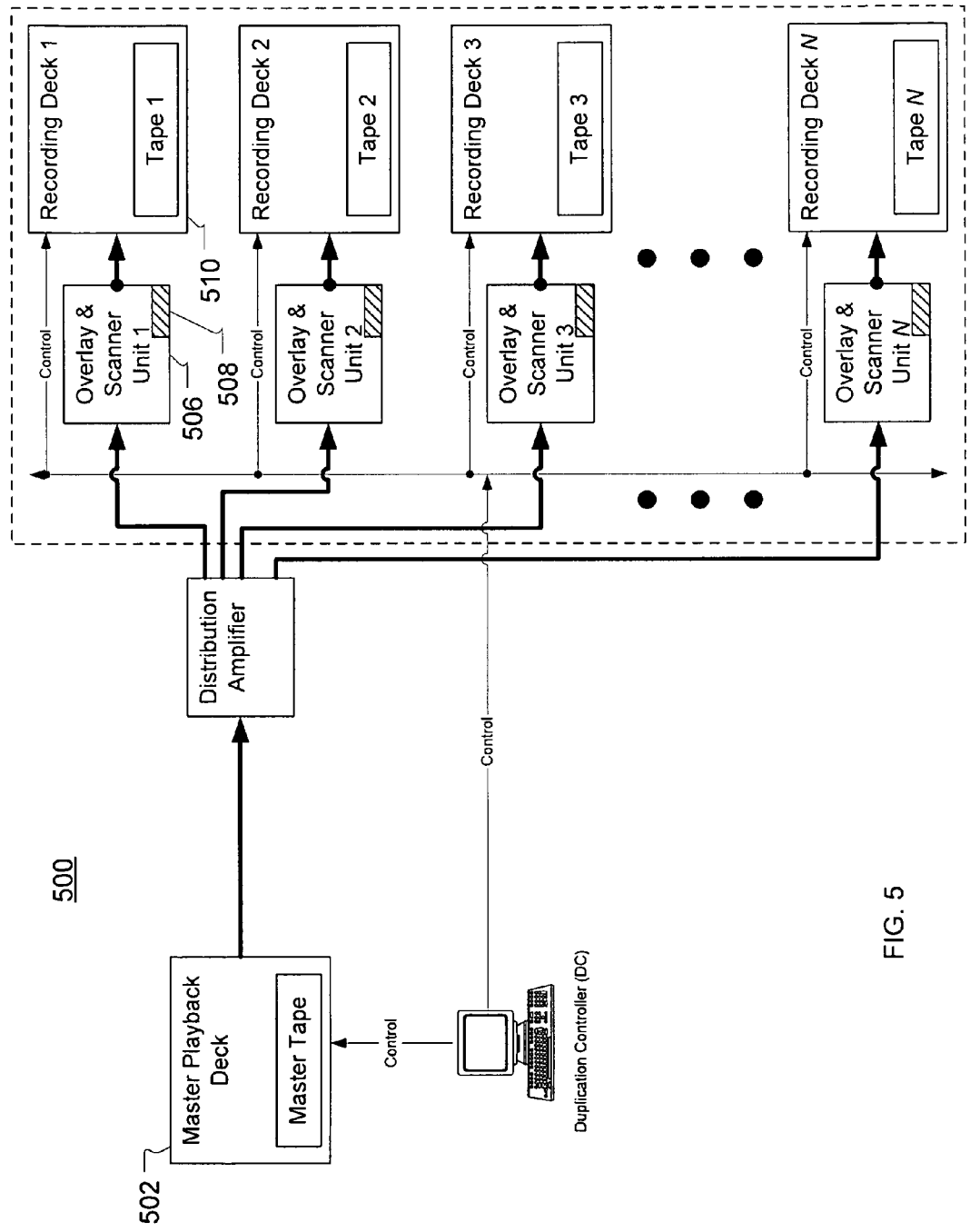
FIG. 5 is a block diagram of a duplication and customization facility that utilizes an overlay unit with integrated scanner according to another embodiment of the present invention.
Figure 6:
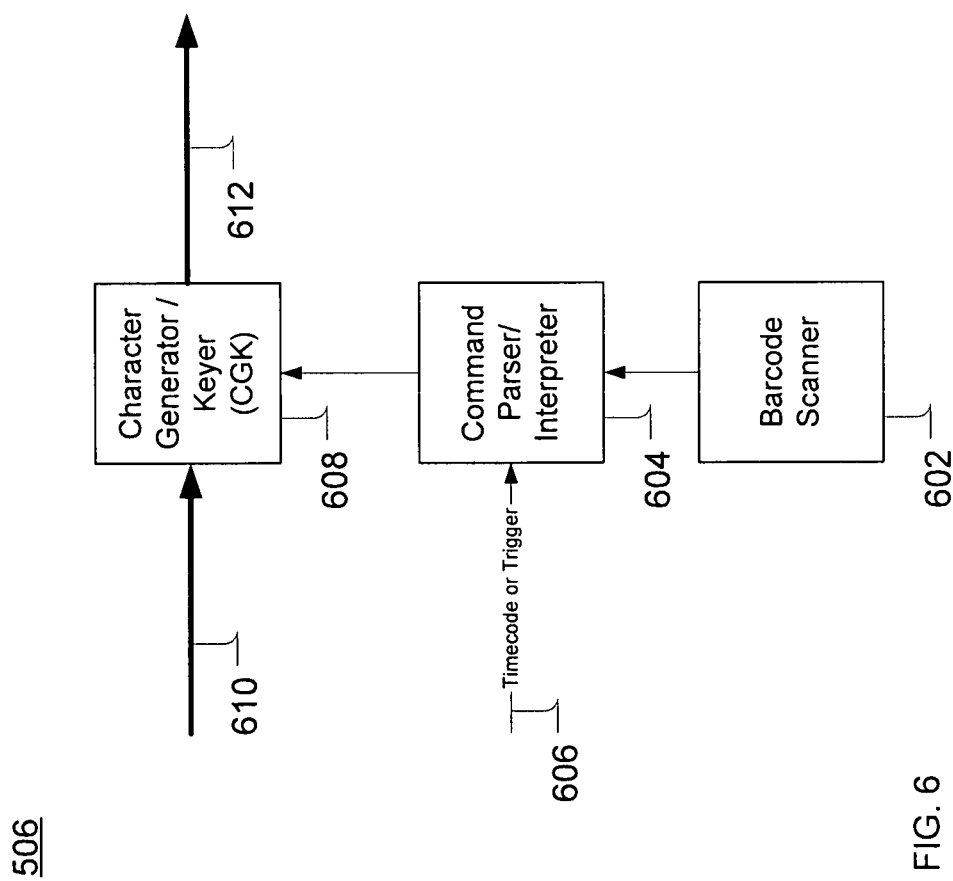
FIG. 6 is a block diagram of an overlay & scanner unit of FIG. 5.

FIG. 6 illustrates overlay & scanner unit 506 of FIG. 5 according to the preceding discussion. As illustrated, it includes barcode scanner 602, command parser/interpreter 604, and character generator/keyer 608.

In operation, barcode scanner 602 scans the barcode from a tape that includes overlay commands. These commands are sent to command parser/interpreter 604, where they are extracted from the barcode framing-structure and sequenced to the CGK following the receipt of a trigger or a particular timecode. The trigger or timecode 606 can be as simple as a relay closure from a manual switch or an output from an SNMP proxy module, although other triggers are possible. Alternatively, the high-density barcode can include a trigger time (e.g., in timecode format) indicating the time at which the overlays are to be executed. A timecode reader (not shown) can monitor the AV being fed into overlay & scanner unit 506, extract the timecode from the feed, and send it to the command parser/interpreter. Within the command parser/interpreter, the timecode is compared to the trigger time and, when they match, the overlay instructions are sequenced to the CGK. CGK 608 receives AV feed 610 from the master-playback deck and produces output feed 612 that includes the overlays.

Other embodiments are possible that are within the scope and intent of the present invention including a facility that includes a recording deck that has an integrated barcode scanner. In that case, the recording deck scans the barcode of an inserted tape and supplies this information to the overlay unit. Alternatively, a high-density barcode scanner that is external to the overlay unit can be used. Also, alternatively, the scanner, overlay unit, and recording deck can be integrated into a single unit.

Additionally, alternatives to barcodes can be used to identify units and/or tapes as would be understood to one skilled in the art, including radio-frequency identification (RFID) tags and reprogrammable data strips.

Duplication and Customization Procedure—High-Density Barcode

Figure 7:
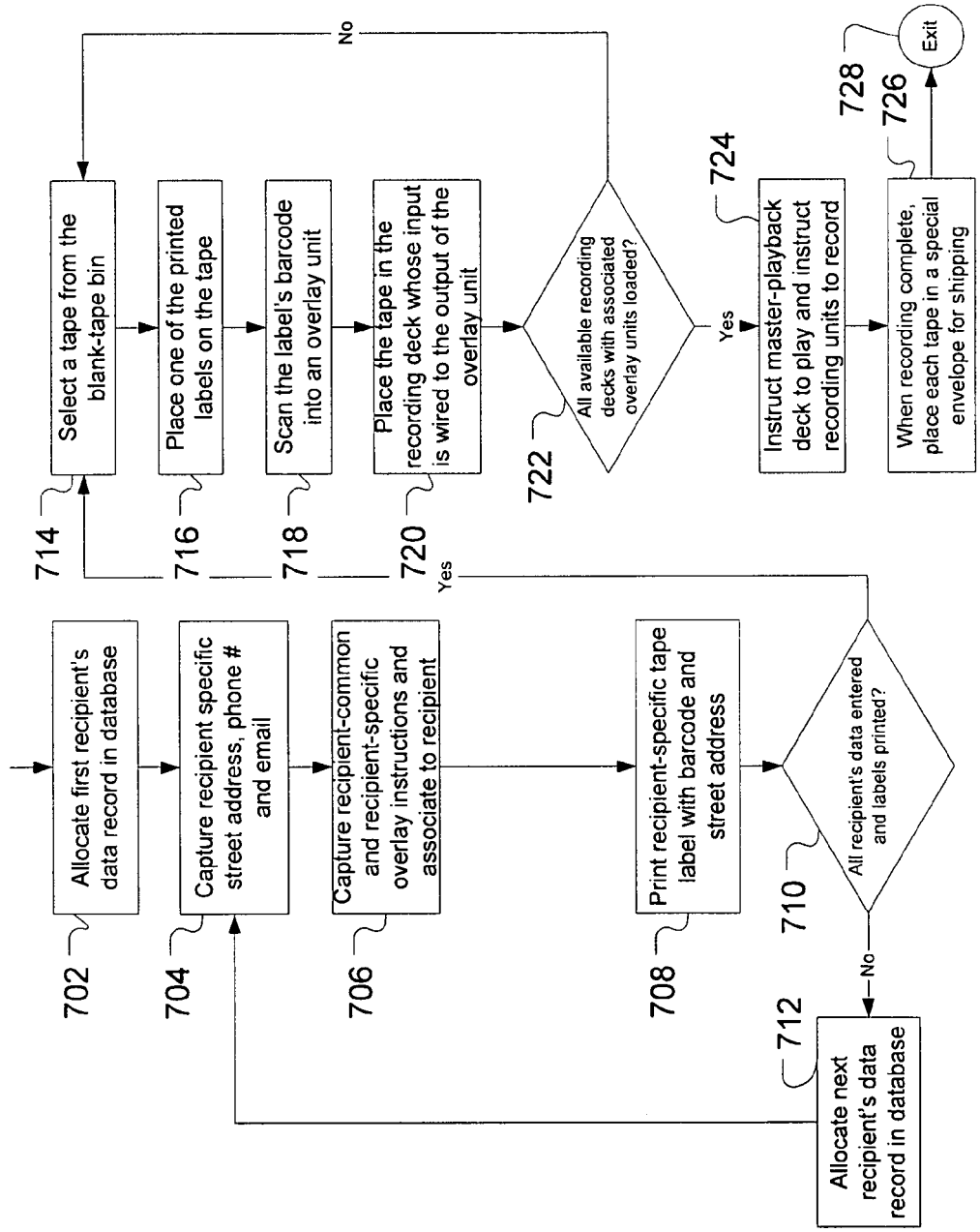
FIG. 7 illustrates a duplication and customization procedure according to one embodiment of the present invention.

FIG. 7 illustrates a duplication and customization procedure according to one embodiment of the present invention. This procedure reduces the probability of errors in customization and duplication of tapes and consequently reduces the probability that a tape might be delivered to the wrong recipient or contain an incorrect customization relative to a recipient.

As illustrated, in step 702, a record corresponding to a first recipient is allocated in a database (e.g., a database accessible to DCC 212 of FIG. 2). Next, in step 704, the record is populated with the recipient's contact information (e.g., street address, phone number, and email address). In step 706, overlay commands in the form of data structures containing instructions for overlays that are to be commonly applied to tape copies for multiple recipients, and data structures containing instructions for overlays that are to be applied specifically to a tape copy for the current recipient, are identified and linked or associated with the current recipient's record in the database. These overlay instructions will typically include one or more timecode triggers indicating when the various overlays should be applied. In step 708, a tape label is printed that includes both a high-density barcode and the recipient's street address (and phone number, if applicable, for example, for a package delivered by a priority, receipt-requested, courier service). The high-density barcode includes the common overlay instructions and recipient-specific overlay instructions that were linked with the recipient's record in the database.

Next, in step 710, a test is performed to see if data for all the recipients have been entered into the database and if all their labels have been printed. If the test fails, then, in step 712, another recipient record is allocated and the process loops back to step 704. If all recipients data has been entered and all labels printed, then in step 714, a blank (or recycled non-blank) tape is selected from a repository of tapes and, in step 716, one of the printed labels is applied to the tape.

In step 718, the barcode on the tape's label is scanned into an overlay unit (e.g., by a scanner associated with or integrated into the overlay unit) and, in step 720, the tape is placed into a recording deck whose input is wired to the output of the overlay unit into which the barcoded overlay instructions and address were just scanned.

In step 722, a test is performed to see if all the decks with associated overlay units have been loaded. Alternatively, a test could have been run to see if all the labels were applied to tapes and all the tapes were loaded into recording decks with associated overlay units. Other alternatives are possible. If the test of step 722 fails, then the procedure loops back to step 714, where another tape is selected.

Once all the tapes have been loaded into the recording units, in step 724, the master-playback unit is instructed to play, and the recording units are instructed to record. Each overlay unit will look for a timecode reference in the input video feed that matches the trigger that was embedded into its commands for when to start the various overlays it was instructed to insert.

When recording is complete, in step 726, each tape is removed from its recording deck and placed into a specially designed shipping envelope that has a window to allow the address that was printed on the tape to be visible external to the envelope. This removes the necessity of printing a separate label and minimizes the possibility of the associated errors. The procedure exits at step 728.

Command Structure

To clarify the concepts of the present invention, the following exemplary overlay-command protocol is presented. This protocol supports communication of overlay commands from a DCC to one or more overlay units via a VBI encoder per various embodiments previously discussed. With appropriate modifications, it can also support the embedding of overlay commands into a high-density barcode.

It will be recognized to one skilled in the art that there are many alternatives for such a protocol, some more or less efficient, and some more or less compatible to existing standards. Although an efficient command protocol is preferable, it is not a necessity for operation of the invention.

For ease of compatibility with commonly available equipment (such as the EEG EN-470 encoder), it is desirable to use an extension or modification of an existing VBI standard (e.g., CEA/EIA-608-B). The EIA/CEA-608-B was developed by the Consumer Electronics Association (and ratified by the FCC in its rules for closed captioning) and is available from Global Engineering Documents (Englewood, Colo.), a division of the information company IHS Engineering.

The exemplary command protocol consists of two sub-protocols: a content "loading" sub-protocol and a content "display" sub-protocol.

Content Loading Sub-Protocol

The content loading sub-protocol supports the communication of content elements into the buffers of the overlay unit. It includes the following exemplary command delimiters:

<header / start byte> (indicates the start of a command)
<address> (16-bit word indicating the unique or group address of an overlay unit or 0xFFFF for "all overlay units")
<text start header> (variable-length string of information that would include a designation of the "page" of text that was to be loaded and its location within the display (e.g., line count within the page conforming to 0 = top of screen and 16 = bottom of page depending on font size)).
<text> (ASCII text and/or bitmapped graphics for insertion)
<text end> (end of text block delimiter)
<trailer / end byte> (indicates end of frame)
<master clear / reset> (indicates to overlay unit to clear contents and display commands)

Content Display Sub-Protocol

The content display sub-protocol supports the communication of instructions that tell the overlay unit how to display the information that was loaded by the content loading sub-protocol. These commands are executed during the playback of the master tape based on a trigger (e.g., a reference timecode). It includes the following exemplary command delimiters:

<key attributes> (designates how content is to be overlaid on the main video feed, e.g., opaque, translucent, or background shadow)
<key in> (indicates duration, for example, 0xFF for "until turned off," or in seconds:frames format: 00:01 for one frame or 09:00 for 9 seconds))
<key out> (indicates end of key)
<display page X> (display page X, which was loaded in the loading phase - it is expected that the overlay unit can hold the equivalent of 3 or 4 full pages of text or bitmapped graphics)

<display X/Y> (indicates motion of an overlay between the coordinates for X and the coordinates for Y to support movement of on-screen information - this makes it difficult for pirates to mask the overlay by simply obscuring a fixed location on the screen)

Database Tables

TABLES 1-4 of FIGS. 8 and 9 represent tables in a database accessible to the DCC. Each row in each of TABLES 1-4 corresponds to a record in the represented database table and each column label in each of TABLES 1-4 corresponds to a field in the database records of the represented database table.

TABLE 1 represents a database table having two-field records containing a one-to-one association between overlay unit serial numbers and recording deck labels. For example, record one indicates that the overlay unit that has serial number 1270 is wired to a recording deck that is labeled 1, record two indicates that the overlay unit that has serial number 1271 is wired to a recording deck that is labeled 2, and so on.

TABLE 2 represents a database table having four-field records. The fields are barcode number on a tape label, the intended recipient of the tape, the affiliation of the recipient, and the recipient's street address. For example, record one indicates that the tape with barcode number 3456 is intended to be sent to John Smith of the New York Times whose business address is 110 American Avenue, New York, N.Y. 10010, and so on.

TABLE 3 represents another database table having two-field records. The fields are page number and the data that is to be overlaid onto a video stream when that page is activated. For example, record one, corresponding to page 0, includes the text string with embedded variable "This videotape is supplied to {Affiliation} with a restricted use agreement." Here the value of the variable {Affiliation} is supplied during the loading of the content into the overlay unit and comes from TABLE 2. The other records are similarly constructed.

TABLE 4 represents a database table having three-field records. Each record in the table contains a time-in, a time-out, and an action field. For example, record one has a time-in of 00:00:00 (minutes:second:frame format), a time-out of 00:02:00, and an action "Full screen display page 0." This record indicates that page 0 should be displayed full screen starting at reference timecode 0 and continuing until reference timecode 2 seconds. The other records are similarly constructed.

Assume for the following discussion that the information in the records of the database is as described with respect to TABLES 1-4. Also assume that overlay unit 1270 is wired upstream in the video path from recording deck 1, which contains tape #3456 intended for recipient John Smith of the New York Times. Also assume that overlay unit 1271 is wired upstream in the video path from recording deck 2, which contains tape #3457 intended for recipient Roger Wilco of the Chicago Sun Times. Also assume that overlay unit 1272 is wired upstream in the video path from recording deck 3, which contains tape #3458 intended for recipient Gene Screen of the Today Show. And, finally, also assume that overlay unit 1273 is wired upstream in the video path from recording deck 4, which contains tape #3459 intended for recipient Matt Flat of Internet Movie Reviews.

With the foregoing assumptions, the following is representative of a command sequence that might be sent out to the four overlay units from the DCC using VBI encoding performed by a VBI encoder that was common to all four units.

Loading Sub-protocol

```
<master clear>
<header start>
<address FFFF>
<page 0 = "This videotape is supplied to {Affiliation} with a restricted use agreement">

<header end>
<null>
<header start>
<address 1270>

<header end>
<null>
<header start>
<address 1271>

(bitmap)
<header end>
<null>
<header start>
<address 1272>

(bitmap)
<header end>
<null>
<header start>
<address 1273>

(bitmap)
<header end>
```

Content Display Sub-Protocol

The following commands are sequenced from the DCC after tape duplication begins and sufficiently in advance of the reference time-in of the commands such that the overlay units can interpret and apply the overlay instructions.

```
</* 00:00:00 00:02:00 (Full screen page 0) */>
<header start>
<address 0xFFFF>
<display page 0>
<key attributes = 100% opaque, shadow = black>
<key in> (at time 00:00:00)
<key out> (at time 00:02:00)
<header end>
</* 00:04:00  00:15:00   Display page 1 translucent key, 50% opaque */>
<header start>
<address 0xFFFF>
<display page 1>
<key attributes = 50% opaque, shadow = black>
<key in> (at time 00:04:00)
<key out> (at time 00:15:00)
<header end>
</* 00:05:00  00:15:00   Move page 1, in X/Y pattern from top right to bottom left every 5 seconds. (key is already in) */>
<header start> (time 00:05:00)
<address 0xFFFF>
<display page 1>

<header end>
<header start /* (time 00:05:05)*/ >
<address 0xFFFF>
<display page 1>

<header end>
<header start> (time 00:05:10)
<address 0xFFFF>
<display page 1>
```

-continued

```

<header end>
</* 00:15:00 00:17:00  Display watermark, page 2, translucent key, 2%,
duration 3 frames, center screen. */>
<header start> (time 00:15:00)
<address 0xFFFF>
<display page 2>

<key attributes = translucent 2%>
<key in duration = 03>
<header end>
```

The present invention has been described in the context of embodiments that generate customized content streams recorded on magnetic tapes. The present invention can also be implemented for applications that record customized content streams onto other suitable types of storage media including: CD-ROM, DVD, harddisk, flash memory, and transmitted information streams. Additionally, these various storage media as well as live content streams (e.g., a sports event) can serve as the master source of content that is to be customized. Note that these master content sources can be streamed at real-time and non-real rates.

Alternatives to VBI, including various video- or audio-encoded in-band signals, may also be used to transmit commands to overlay units.

The content streams as described herein may be in digital or analog form.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims are recited in a particular sequence, unless the claim recitations otherwise imply a particular sequence for implementing some or all of those steps, those steps are not necessarily intended to be limited to being implemented in that particular sequence.

What is claimed is:

1. A method for processing a content stream comprising one or more of audio content and video content, the method comprising:
   encoding two or more different sets of customization data into the content stream to generate an encoded content stream, wherein:
      each set of customization data includes (1) an identifier for a different set of one or more customization devices and (2) modification information associated with the identifier;
      each different customization device is adapted to receive and modify a corresponding copy of the encoded content stream based on the modification information in the corresponding set of customization data to generate a customized content stream, wherein:
         the plurality of received copies of the encoded content stream are substantially identical; and
         the customized content stream comprises both the content stream and an overlay content based on the modification information in the corresponding set of customization data;
   a label affixed to a storage medium includes an identifier for the storage medium and a mailing address for an intended destination of the storage medium;
   an information tag is uniquely associated with a first customization device of the customization devices;
   the identifier of the storage medium and the information from the tag are used to determine the identifier for the first customization device, which is included in a first set of customization data, from the sets of customization data;
   the content stream is modified by the first customization device according to the first set of customization data to produce a first customized content stream; and
   the first customized content stream is recorded onto the storage medium.

2. The method of claim 1, further comprising distributing the encoded content stream to a plurality of different customization devices, wherein each customization device:
   extracts, from its received copy of the encoded content stream, modification information from the corresponding set of customization data; and
   modifies the encoded content stream based on the modification information to generate the corresponding customized content stream.

3. The method of claim 1, further comprising storing associations in a database, wherein at least one association directly or indirectly links at least one of the sets of customization data to the identifier for the corresponding customization device.

4. The method of claim 1, further comprising storing associations in a database, wherein at least one association directly or indirectly links at least one of the sets of customization data to an identifier for an intended recipient for the customized content stream corresponding to the set of customization data.

5. The method of claim 1, wherein:
   (a) the two or more different sets of customization data include at least the first set of customization data and a second set of customization data different from the first set of customization data;
   (b) the first set of customization data includes (1) a first identifier for a first set of customization devices and (2) first modification information associated with the first identifier;
   (c) the second set of customization data includes (1) a second identifier for a second set of customization devices and (2) second modification information associated with the second identifier, wherein:
      (i) the second identifier is different from the first identifier;
      (ii) the second set of customization devices is different from the first set of customization devices; and
      (iii) the second modification information is different from the first modification information;
   (d) at least one customization device of the first set of customization devices generates the first customized content stream by overlaying on the encoded content stream a first additional information based on the first modification information; and
   (e) at least one customization device of the second set of customization devices generates a second customized content stream different from the first customized content stream by overlaying on the encoded content stream a second additional information based on the second modification information, wherein the second additional information is different from the first additional information.

6. The method of claim 1, wherein the different sets of one or more customization devices are co-located in one facility.

7. An apparatus comprising a customization device for generating a customized content stream, wherein:
- a label affixed to a storage medium includes an identifier for the storage medium and a mailing address for an intended destination of the storage medium;
- an information tag is uniquely associated with the customization device;
- the identifier of the storage medium and the information from the tag are used to determine an identifier for the customization device, which is included in a first set of customization data;
- an address specific to a set of one or more customization devices, which includes the customization device, is derived from the identifier of the customization device;
- the customization device is assigned the address
- the customization device comprises:
  - at least one input port adapted to receive an encoded content stream comprising two or more different sets of customization data and one or more of audio content and video content, wherein, each set of customization data includes an identifier specific to a set of one or more customization devices; and
  - at least one processor adapted to determine whether the identifier in each set of customization data corresponds to the address specific to the customization device, wherein the at least one processor is further adapted to, when the address and the identifier correspond:
    - extract, from the received encoded content stream, information from the set of customization data corresponding to the customization device; and
    - modify the encoded content stream based on information in the corresponding set of customization data to generate the customized content stream; and
- the customized content stream is recorded onto the storage medium.

8. The apparatus of claim 7, wherein:
- the at least one input port is further adapted to receive identification information from a label associated with the storage medium for the customized content stream corresponding to the customization device; and
- the at least one processor is further adapted to derive the address from the identification information received.

9. The apparatus of claim 8, wherein the label is a barcode label and the at least one input port is operatively coupled to a barcode reader adapted to retrieve the identification information from the barcode label for provision to the at least one processor.

10. The apparatus of claim 7, wherein:
- the apparatus is a system comprising a plurality of customization devices including the customization device, the customization devices co-located in one facility;
- the system further comprises:
  - (1) a master playback device adapted to generate a content stream comprising the one or more of audio content and video content;
  - (2) an encoder adapted to receive the content stream from the master playback device and generate the encoded content stream by encoding the two or more different sets of customization data into the content stream; and
  - (3) a distributor adapted to receive the encoded content stream from the encoder and provide a plurality of substantially identical copies of the encoded content stream to the corresponding input ports of the plurality of co-located customization devices.

11. The apparatus of claim 10, wherein the master playback device, the encoder, and the distributor are co-located with the plurality of co-located customization devices.

12. The apparatus of claim 10, wherein each customization device comprises an overlay unit and a recording deck connected to record the output of the overlay unit.

13. The apparatus of claim 7, wherein the customized content stream comprises both the content stream and an overlay content based on the information extracted from the corresponding set of customization data.

14. A method for distributing individualized content, the method comprising:
- (a) broadcasting a content stream comprising one or more of audio content and video content to a plurality of sets of one or more customization devices;
- (b) delivering a unique set of customization data to each set of one or more customization devices, wherein:
  - (i) each unique set of customization data is based on an intended recipient of a storage medium adapted to store a corresponding customized version of the content stream;
  - (ii) each different customization device in the set of one or more customization devices is adapted to:
    - (1) receive the broadcast content stream; and
    - (2) modify the broadcast content stream based on modification information in the unique set of customization data corresponding to the set of one or more customization devices to generate the corresponding customized version of the content stream;
  - (iii) a label affixed to each storage medium includes an identifier for the storage medium and a mailing address for the intended recipient of the storage medium;
  - (iv) an information tag is uniquely associated with each different customization device;
  - (v) the identifier of the storage medium and the information from the tag are used to determine an identifier for the corresponding customization device, which is included in the corresponding unique set of customization data; and
- (c) recording each corresponding customized version of the content stream to the corresponding storage medium, wherein the storage medium is labeled with the mailing address for the intended recipient of the storage medium.

15. The method of claim 14, wherein the corresponding customized version of the content stream comprises both the content stream and an overlay content based on modification information in the unique set of customization data corresponding to the set of one or more customization devices.

16. A method comprising:
- combining a set of customization data with a storage medium to create a combined storage medium adapted to store a customized content stream, wherein:
  - a label affixed to the combined storage medium includes an identifier for the storage medium and a mailing address for an intended destination of the storage medium;
  - an information tag is uniquely associated with a first customization device; and
  - the identifier of the combined storage medium and the information from the tag are used to determine an identifier for the first customization device, which is included in the set of customization data;

retrieving the set of customization data from the combined storage medium;

receiving a content stream comprising one or more of audio content and video content;

generating the customized content stream by modifying the content stream using the set of customization data; and storing the customized content stream in the combined storage medium.

17. The method of claim 16, wherein:
the label encodes the set of customization data;
the set of customization data is retrieved from the combined storage medium using a label reader;
the customization device receives the set of customization data from the label reader; and
a recording device stores the customized content stream into the combined storage medium.

18. The method of claim 16, wherein the combined storage medium includes a visible address of an intended destination for the combined storage medium having the customized content stream, wherein the visible address is located on the combined storage medium so as to correspond with a window in a mailing envelope to be used to send the combined storage medium having the customized content stream to the intended destination.

19. The method of claim 16, wherein the customized content stream comprises both the content stream and an overlay content based on the set of customization data.

20. A system comprising:
(1) a master playback device adapted to generate a content stream comprising one or more of audio content and video content;
(2) an encoder adapted to generate an encoded content stream by encoding two or more different sets of customization data into the content stream, wherein each set of customization data includes modification information and an identifier associated with the modification information;
(3) a distributor adapted to generate a plurality of substantially identical copies of the encoded content stream; and
(4) a plurality of co-located customization devices, wherein:
  (a) each customization device has an identifier, wherein:
    a label affixed to a corresponding storage medium includes an identifier for the storage medium and a mailing address for an intended destination of the storage medium;
    an information tag is uniquely associated with the customization device;
    the identifier of the storage medium and the information from the tag are used to determine the identifier for the customization device, which is included in a first set of customization data, from the sets of customization data; and
    at least two identifiers are different; and
  (b) each customization device is adapted to:
    (i) receive one of the plurality of substantially identical copies of the encoded content stream;
    (ii) determine whether to process the modification information of each of the two or more sets of customization data based on whether the corresponding identifier associated with the modification information matches the identifier of the customization device;
    (iii) generate a customized content stream by modifying the content stream according to the first set of customization to produce a customized content stream, wherein the modifying comprises inserting an overlay into its received copy of the encoded content stream, the overlay based on the processed modification information; and
    (iv) record the customized content stream onto the corresponding storage medium.

* * * * *